United States Patent Office 3,378,441
Patented Apr. 16, 1968

3,378,441
TETRAENE ANTIBIOTIC PURIFICATION
Homer J. Bridger, New York, N.Y., assignor to S. B. Penick & Company, New York, N.Y., a corporation of Delaware
No Drawing. Filed Oct. 17, 1963, Ser. No. 317,041
8 Claims. (Cl. 167—65)

This invention relates to an improvement in the isolation and recovery of a tetraene antibiotic from the fermentation beers. More particularly this invention is concerned with an isolation and recovery process that is economically feasible and the tetraene variously known as Pimaricin or Tennecetin is recovered in excellent yield.

The new tetraene antibiotic with which this invention is generally concerned was reported by Burns and Holtman of the University of Tennessee in Antibiotics and Chemotherapy, volume 9, pages 398–405 (1959). It was characterized by them as a tetraene and was derived from the growth of *Streptomyces chattanogensis* organisms grown in a nutrient medium. They named this antifungal antibiotic Tennecetin.

On August 10, 1960, British patent specification 844,289 was published disclosing and describing the antifungal antibiotic Pimaricin derived from *Streptomyces natalensis* by certain physical and biological properties. Recent studies indicate that Tennecetin and Pimaricin may be identical or substantially so, by all tests presently applicable.

According to the Burns and Holtman references, the antibiotic activity is extracted from the fermentation beers in which it is elaborated by the organism by a solvent extraction process in which the clarified or filtered beers (freed from cellular tissue) are contacted with a water-immiscible alkanol. According to these methods, butanol, their preferred alkanol is used as the extractant in amounts ranging from 25% to 90% of the original fermentation beer volume. This large volume of solvent is then evaporated to concentrate the antibiotic that it may be conveniently purified and recovered.

Since the antibiotic is elaborated in the beers in extreme dilution, the commercial fermentation involves hundreds and thousands of gallons of beers and consequently, according to the known art, very large quantities of the extractant alkanol. Handling, evaporation and recovery of such large volumes of extractant solvent are expensive and add considerably to the final cost of the pure antibiotic.

The British patent additionally discloses precipitation of the antibiotic activity in and on the mycellia and extraction therefrom with methanol containing up to 5% calcium chloride. The latter is added to increase the solubility of the antibiotic in the methanol. Due to the cellular and cellulosic in character of the mycellia, considerable time and solvent are needed for proper extraction of all the activity from such a substrate.

It is an object of this invention to simplify the isolation and purification procedures leading to the recovery in good yield of the antibiotic activity.

It is a further object of this invention to provide a process for the concentration of the antibiotic from the beers involving minimum solvent and time.

It is another object of this invention to provide a process for the recovery and purification of the above mentioned tetraene antibiotic in good yield using economical solvents that can be recovered with ease.

The above objects are realized by the invention which includes the steps of salting out the antibiotic from acidified solution of the beers, recovering the precipitated antibiotic in concentrated solid form, purifying the antibiotic by washing the precipitated antibiotic with bicarbonate solutions and for solvents which do not dissolve the antibiotic, then dissolving the antibiotic concentrate in a lower alkanol to free it from salt and finally recovering the purified antibiotic from its lower alkanol solution.

The fermentation of these antibiotics is carried out in nutrient solutions containing sources of assimilable carbon, preferable carbohydrates, sources of inorganic or organic nitrogen and mineral salts in trace form. The rate of growth of the organism and the yield of the antibiotic activity, Tennecetin or Pimaricin, can be controlled by varying the proportions of the above ingredients, as well as the temperature, agitation and aeration of the medium itself during the growth period.

The fully fermented beers generally contain approximately 600 to 750 micrograms of antibiotic per milliliter. Often it is more economical to recover the beers when the antibiotic concentration is at a lower level, since the fermentation times involved to achieve the higher levels increase times charges on equipment out of proportion to the increased yields.

The fermentation beers, pH 6.5–7.5 are filtered. Due to the mucilaginous nature of the mycellia, filtration is expedited by the addition of up to 1% of a filter aid. The mycellia mat is washed with a small amount of water and the clear beer and washings are combined. To this is added a mineral salt, sodium chloride is preferred, until the solution contains 25 to 36% by weight of the salt.

The high salt concentration insures the "salting out" of substantially all antibiotic activity. This salt solution is adjusted to pH 2.5–3.0 with a mineral acid, hydrochloric acid is preferred but other acids such as phosphoric acid may be used. The resultant filter aid, antibiotic and salt slurry is filtered. The wet cake is collected and the filtrate is discarded. The wet cake may be washed with either small quantities of concentrated or saturated sodium bicarbonate solutions or with acetone or both to remove impurities and non-active colorants. The cake is then extracted (it is first acidified if a bicarbonate wash was used) with methanol or ethanol or a mixture thereof by stirring the cake with the alkanol and then filtering off the alcoholic solution of the antibiotic activity. This solution is concentrated and then spray-dried to yield a product of 85 to 95% purity. Recovery ranges between 40 and 70% of the antibiotic activity present in the crude beers by microbiological assay. The recovered antibiotic ranges up to about 950 micrograms per milligram purity.

The process of the invention is described in the appended examples. The examples are merely illustrative and are not meant in any way to confine the scope of this patent. It should be understood that each of the variants within the scope of this disclosure has certain advantages for certain specific purposes and is not meant to indicate any preferred commercial method.

EXAMPLE 1

Crude beers assaying 590 micrograms per milliliter are mixed with 3% by weight of filter aid (Hyflo) and filtered. The clear beer is treated with an additional 0.5% of filter aid and enough salt is added to yield a 32% by weight solution of salt in the clear beer. During the mixing the pH of the mixture is adjusted to pH 2.6 with hydrochloric acid. The mixture is then filtered and the filter cake is pressed. The crude cake is slurried to a thick paste with distilled water and bicarbonate of soda ($NaHCO_3$) is added to a concentration of 36% (by weight) of the slurry water. This slurry is adjusted to pH 7.5–7.8 with sodium hydroxide solution and is filtered. The dry cake is washed with 7% by weight of sodium bicarbonate solution, then with acetone and is then dried. The dry cake is slurried with 3A alcohol (ethanol denatured with methanol) in a 40% concentration by weight of the cake in the alcohol. This slurry is then adjusted to pH 2.8–3.0 with hydrochloric acid, filtered and the cake is washed with further quantities of alcohol. The filtrate containing the antibiotic activity is concentrated to one-tenth of the original volume, and the pH is adjusted to the range 7.0–7.2 and the concentrate is spray-dried to a light yellow powder. The antibiotic is recovered in 900 micrograms per milligram purity.

EXAMPLE 2

Crude beers assaying 675 micrograms per milliliter are mixed with 2% by weight of filter aid (Dicalite) and filtered. The resultant clear beers are treated with an additional 0.5% of filter aid and salt is added sufficient to provide a 30% by weight solution of salt in the clear beer. The pH of this salt-beer mixture is adjusted to pH 2.5 with hydrochloric acid. The mixture is filtered, and the cake is pressed. The cake is washed with successive small portions of acetone and the crude cake containing approximately 40% water is slurried in two parts by weight of 3A alcohol. The slurry is mixed, filtered and washed with successive small portions of 3A alcohol. The filtrate is then concentrated to one-tenth the original volume and the pH is adjusted to 7.0–7.2. The concentrate is then spray-dried to yield a light yellow powder, assaying at 900 micrograms per milligram of purity.

EXAMPLE 3

Crude beers assaying 700 micrograms per milliliter are filtered in the presence of a small amount of filter aid. The clear beer is treated with an additional amount of filter aid and 30% by weight of salt is added to the clear beer, which is adjusted to a pH of 2.5 with hydrochloric acid. The salt-beer mixture is filtered and the cake is pressed. The cake is washed with four successive portions of 7% sodium bicarbonate solution and it is pressed after the final wash. It is then washed with two portions of acetone. The cake is then removed from the filter, slurried in 3A alcohol to form a 40% by weight slurry of the cake in alcohol and the pH of the slurry is adjusted to 2.8. This slurry is then filtered, the filtrate concentrated to one-tenth the original volume, the pH of the concentrate is adjusted to 7.0–7.2 and the material is spray-dried. An antibiotic activity assaying 950 micrograms per milligram purity was obtained.

I claim:
1. The process of extracting and purifying tetraene antibiotics selected from the class consisting of Pimaricin and Tennecetin, which comprises:
 (a) the step of salting out with inorganic salts the crude antibiotic activity from acidified clear beers;
 (b) collecting the precipitate;
 (c) purifying by washing the crude antibiotic activity with a solvent in which the antibiotic activity is relatively insoluble;
 (d) dissolving the purified antibiotic in a lower alkanol;
 (e) recovering the antibiotic activity by evaporating the alkanol.
2. The process according to claim 1 wherein the inorganic salt is sodium chloride.
3. The process according to claim 1 wherein the solvent is chosen from the group consisting of concentrated aqueous sodium bicarbonate solutions and acetone.
4. The process according to claim 1 wherein the lower alkanol is water miscible.
5. The process according to claim 4 wherein the lower alkanol is ethanol.
6. The process according to claim 4 wherein the lower alkanol is methanol.
7. The process according to claim 4 wherein the lower alkanol is a mixture of ethanol and methanol.
8. The process according to claim 1 wherein the evaporation of the alkanol includes a spray-drying step.

References Cited

Chem. Abst., vol. 64, No. 6, pp. 8820A, March 1966.

SAM ROSEN, *Primary Examiner.*